United States Patent
Aberl et al.

(10) Patent No.: US 11,811,574 B2
(45) Date of Patent: Nov. 7, 2023

(54) DETECTION OF IN-BAND INTERFERENCE

(71) Applicant: TEXAS INSTRUMENTS INCORPORATED, Dallas, TX (US)

(72) Inventors: Peter Aberl, Kranzberg (DE); Sandeep Rao, Bangalore (IN); Anil Mani, Bangalore (IN)

(73) Assignee: Texas Instruments Incorporated, Dallas, TX (US)

(*) Notice: Subject to any disclaimer, the term of this patent is extended or adjusted under 35 U.S.C. 154(b) by 12 days.

(21) Appl. No.: 17/722,542

(22) Filed: Apr. 18, 2022

(65) Prior Publication Data

US 2023/0231753 A1 Jul. 20, 2023

(30) Foreign Application Priority Data

Jan. 19, 2022 (IN) .............................. 202241003166

(51) Int. Cl.
*H04L 27/26* (2006.01)
*H04B 1/40* (2015.01)
*H04B 1/71* (2011.01)

(52) U.S. Cl.
CPC ............. *H04L 27/265* (2013.01); *H04B 1/40* (2013.01); *H04B 1/7102* (2013.01)

(58) Field of Classification Search
CPC ........ H04L 27/265; H04B 1/40; H04B 1/7102
See application file for complete search history.

(56) References Cited

U.S. PATENT DOCUMENTS

| | | | |
|---|---|---|---|
| 10,212,831 B2 | 2/2019 | Karszt et al. | |
| 10,359,504 B2 | 7/2019 | Fetterman et al. | |
| 10,539,670 B2 | 1/2020 | Boutin et al. | |
| 10,690,748 B2 | 6/2020 | Paradie | |
| 10,955,541 B2 | 3/2021 | Boutin et al. | |
| 2008/0279256 A1* | 11/2008 | Zhao | H04B 1/7102 375/E1.023 |
| 2012/0306695 A1* | 12/2012 | Kim | G01S 19/015 342/357.59 |

FOREIGN PATENT DOCUMENTS

EP 3244229 A1 11/2017

OTHER PUBLICATIONS

Melzer et al., "Short-Range Leakage Cancellation in Automotive Radar Systems," 4 pages.
Wagner et al., "Threshold-Free Interference Cancellation Method for Automotive FMCW Radar Systems," 2018, 4 pages.

* cited by examiner

*Primary Examiner* — Sung S Ahn
(74) *Attorney, Agent, or Firm* — Michael T. Gabrik; Frank D. Cimino

(57) ABSTRACT

A method is provided. In some examples, the method includes performing, by processing circuitry, a first transform operation on a first time-domain data set to generate a frequency-domain data set. In addition, the method includes determining, by the processing circuitry, that at least one portion of the frequency-domain data set satisfies a first threshold magnitude. The method also includes performing, by the processing circuitry, an inverse transform operation on the at least one portion of the frequency-domain data set to generate a second time-domain data set. The method further includes identifying, by the processing circuitry and based on the second time-domain data set, a region of interference in the first time-domain data set.

20 Claims, 9 Drawing Sheets

DETECTION OF IN-BAND INTERFERENCE

This application claims the benefit of Indian Provisional Patent Application No. 202241003166, filed Jan. 19, 2022, the entire content being incorporated herein by reference.

BACKGROUND

A sensor such as radar can detect an object by transmitting a signal and receiving a reflection of the transmitted signal. A nearby transmitter can impair the performance of the sensor if a signal generated by the transmitter is in the same frequency band as the signal generated by the sensor. This interference can obscure the sensor's ability to detect an object because the sensor cannot distinguish between transmitted signals and reflected signals. Thus, the sensor becomes temporarily blinded by the nearby transmitter.

One environment that provides an example of this interference is automotive radar. Numerous automobiles equipped with radar sensors may be traveling on the same roadway, potentially causing the transmitter of each radar sensor to interfere with the receivers of other vehicles. The number of cars on the road equipped with radar is expected to increase in coming years, especially with safety standards requiring radar sensors for certain classifications.

SUMMARY

In some examples, a method includes performing, by processing circuitry, a first transform operation on a first time-domain data set to generate a frequency-domain data set. In addition, the method includes determining, by the processing circuitry, that at least one portion of the frequency-domain data set satisfies a first threshold magnitude. The method also includes performing, by the processing circuitry, an inverse transform operation on the at least one portion of the frequency-domain data set to generate a second time-domain data set. The method further includes identifying, by the processing circuitry and based on the second time-domain data set, a region of interference in the first time-domain data set.

In further examples, a device includes a receiver configured to generate an analog signal based on received signals. The device also includes an analog-to-digital converter configured to convert the analog signal to a first time-domain data set. The device further includes processing circuitry configured to perform a first transform operation on the first time-domain data set to generate a frequency-domain data set. In addition, the processing circuitry is configured to determine that at least one portion of the frequency-domain data set satisfies a first threshold magnitude. The processing circuitry is also configured to perform an inverse transform operation on the at least one portion of the frequency-domain data set to generate a second time-domain data set. The processing circuitry is further configured to identify, based on the second time-domain data set, a region of interference in the first time-domain data set.

In yet further examples, a non-transitory computer-readable medium has executable instructions stored thereon, configured to be executable by processing circuitry for causing the processing circuitry to perform a first transform operation on a first time-domain data set to generate a frequency-domain data set. In addition, the instructions cause the processing circuitry to determine that at least one portion of the frequency-domain data set satisfies a first threshold magnitude. The instructions also cause the processing circuitry to perform an inverse transform operation on the at least one portion of the frequency-domain data set to generate a second time-domain data set. The instructions further cause the processing circuitry to identify, based on the second time-domain data set, a region of interference in the first time-domain data set.

BRIEF DESCRIPTION OF THE DRAWINGS

Features of the present invention may be understood from the following detailed description and the accompanying drawings. In that regard.

DETAILED DESCRIPTION

Specific examples are described below in detail with reference to the accompanying figures. It is understood that these examples are not intended to be limiting, and unless otherwise noted, no feature is required for any particular example. Moreover, the formation of a first feature over or on a second feature in the description that follows may include examples in which the first and second features are formed in direct contact and examples in which additional features are formed between the first and second features, such that the first and second features are not in direct contact.

Interference caused by a nearby transmitter can cause a sensor to be temporarily impaired. Often, this impairment lasts for a very short period of time, particularly with frequency-modulated continuous wave (FMCW) transmitters. This disclosure describes techniques for identifying data samples that are impaired by interference. These techniques can include transforming a data set from the time domain into the frequency domain and performing a threshold operation to identify a portion of the frequency-domain data. Once the identified portion of the frequency-domain data is transformed back into the time domain, the impaired subset of data samples may be much more easily isolated and repaired, as compared to simply thresholding the original time-domain data set without transforming the data set into the frequency domain. Of course, these advantages are merely examples, and no advantage is required for any particular embodiment.

Figure 1:
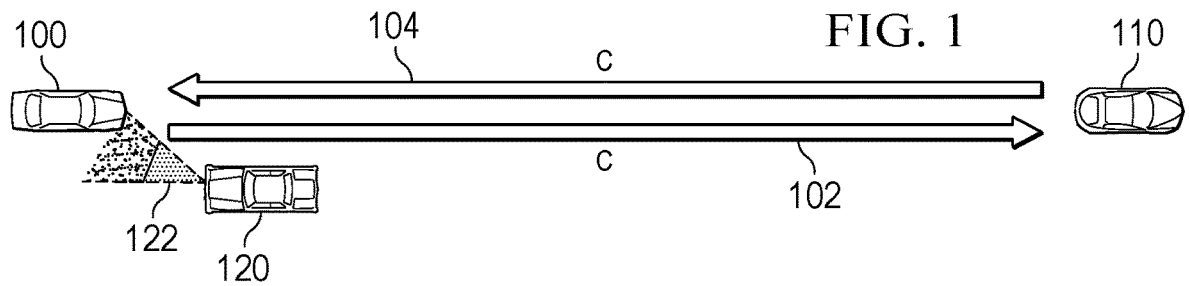
FIG. 1 is a conceptual block diagram of interference caused by automotive radar sensors according to some aspects of the present disclosure.

Examples of interference detection are described with reference to the figures below. In that regard, FIG. 1 is a conceptual block diagram of interference caused by automotive radar sensors according to some aspects of the present disclosure. Although FIG. 1 depicts cars on a roadway, the techniques of this disclosure are applicable to other vehicle environments such as high-speed travel on a highway or dense urban environments including pedestrians, cyclists, and buildings. The techniques of this disclosure are also applicable to other vehicles such as trucks, construction equipment, motorcycles, bicycles, aircraft, marine vehicles, drones, unmanned vehicles, autonomous vehicles, or even spacecraft. The techniques of this disclosure may also be applied to robotic equipment in an industrial setting, such as a factory, warehouse, or loading dock. In addition, although this disclosure describes techniques that can be used with a radar sensor, the techniques of this disclosure can be used with other sensors, such as lidar, ultrasound, cameras (e.g., visual light and/or infrared), and/or any other sensors.

In the example shown in FIG. 1, vehicles 100 and 110 are travelling in the same direction on a roadway. Vehicle 100 may be following behind vehicle 110. Vehicle 100 may include an assisted driving capability such as adaptive cruise control that determines a distance from vehicle 100 to vehicle 110 based on signals 102 and 104. Vehicle 120 is traveling in the opposite direction of vehicles 100 and 110. A transmitter onboard vehicle 120 may interfere with a detection system onboard vehicle 100.

A transmitter onboard ownship vehicle 100 transmits signal 102, which reflects off vehicle 110 as reflection signal 104. A receiver onboard ownship vehicle 100 receives reflection signal 104, which may include a portion of the energy of signal 102 that bounced off of vehicle 110. Processing circuitry onboard ownship vehicle 100 may determine the distance between vehicles 100 and 110 based on characteristics of reflection signal 104. These characteristics may include the frequency of reflection signal 104 and/or the frequency difference between signals 102 and 104. The processing circuitry may also determine the azimuth angle of vehicle 110 relative to vehicle 100, the elevation angle of vehicle 110 relative to vehicle 100, and/or the velocity of vehicle 100.

Vehicle 120 is also equipped with a transmitter that sends signal 122 towards ownship vehicle 100. Additionally or alternatively, signal 122 may include noise generated by vehicle 120, and the receiver onboard ownship vehicle 100 receives the noise. In examples in which a frequency of signal 122 is within a frequency band used by the sensor onboard ownship vehicle 100, signal 122 may interfere with the detection system onboard ownship vehicle 100. The magnitude of signal 122, as received by vehicle 100, may be stronger or weaker than the magnitude of reflection signal 104, as received by vehicle 100. Signal 122 may raise the noise floor of the frequency spectrum of signals received by the detection system onboard ownship vehicle 100, which reduces the signal-to-noise ratio and makes it less likely that processing circuitry onboard ownship vehicle 100 can detect objects such as vehicle 110. On an actual roadway, there may be many more objects and transmitters than shown in FIG. 1. Thus, it is desirable for the detection system onboard vehicle 100 to coexist and function properly even in the face of interfering signals from a nearby transmitter.

Figure 2A:
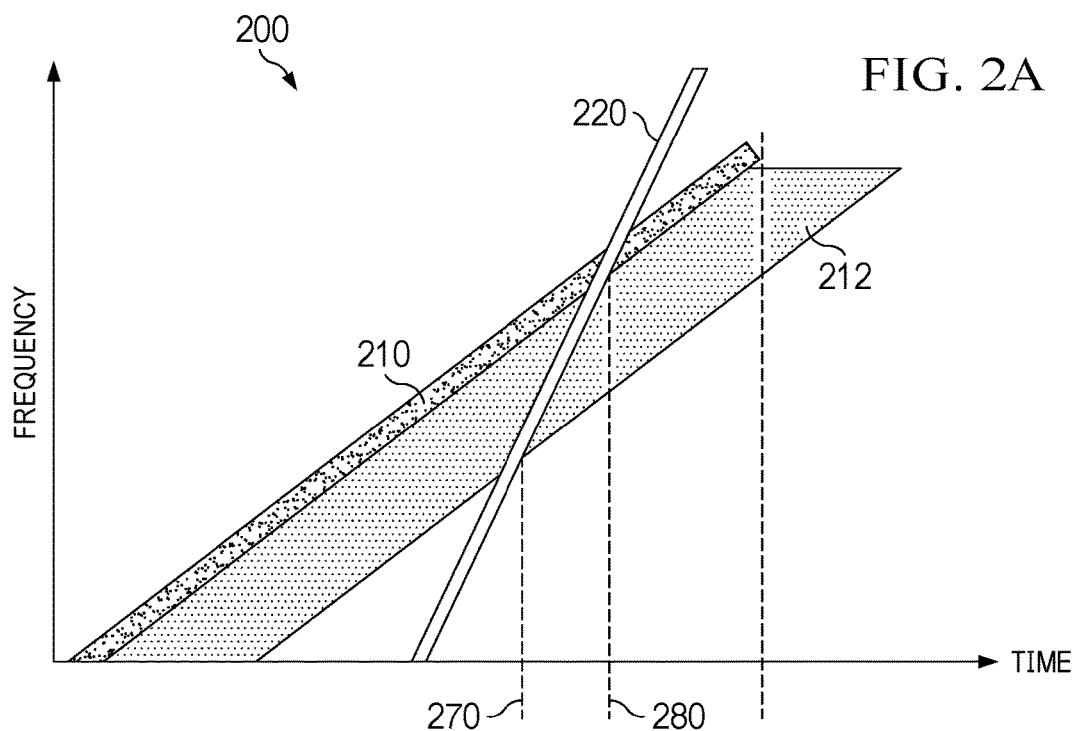
FIG. 2A is a graph of frequency of a continuous wave over time.

FIG. 2A is a graph 200 of frequency of a continuous wave over time. Ramp 210 represents the frequency of a chirp transmitted by an FMCW radar. In FIG. 2A, ramp 210 is shown with a frequency that varies linearly with time. In-band frequency range 212 represents the frequencies of interest to the detection system, such as a few tens of megahertz below the transmitted frequency of ramp 210 because the receiver receives a delayed version of ramp 210. The down-conversion, low-pass filtering, and processing of the receiver may affect the range of in-band frequency range 212. In-band frequency range 212 varies linearly with time, just like ramp 210, because the detection system is interested in objects within certain ranges. Ranges that are not of interest include objects that are very close to the sensor (e.g., the bumper of the ownship vehicle) or very far from the sensor, such as several kilometers away, depending on the application.

A crossing interferer transmits a continuous wave that is represented by ramp 220. The slope of ramp 220 is different from the slope of ramp 210, such that ramp 220 passes through in-band frequency range 212 for a short duration bounded by times 270 and 280. Ramp 220 crosses ramp 210 around time 280, and ramp 220 is within in-band frequency range 212 for a short duration before crossing ramp 210. Additional example details of continuous wave radar can be found in commonly assigned U.S. Pat. No. 11,125,856, entitled "Distance Measurement Using Millimeter Wave Radar," issued on Sep. 21, 2021; U.S. Pat. No. 11,054,500, entitled "Noise Measurement in a Radar System," issued Jul. 6, 2021; and U.S. Pat. No. 10,768,278, entitled "Field Monitoring of Analog Signals in a Radar System," issued on Sep. 8, 2020, each of which is incorporated by reference in its entirety.

Crossing interferers may be relatively common where a technical standard requires that sensors use the same frequency band. For example, some automotive radar use a frequency band that includes seventy-seven gigahertz, according to regulations made by Federal Communications Commission or the European Telecommunications Standard Institute. Radar interference events occur when the radar modules on multiple vehicles are using the same frequency band in a close area simultaneously. Each radar module may transmit a succession of chirps, where the duration, frequency range, and slope of each chirp may vary across radar modules. Additionally, each radar module may change these parameters across chirps. In other words, each radar chirp may have different characteristics in order to avoid consistently interfering with the chirps of nearby sensors.

Figure 2B:
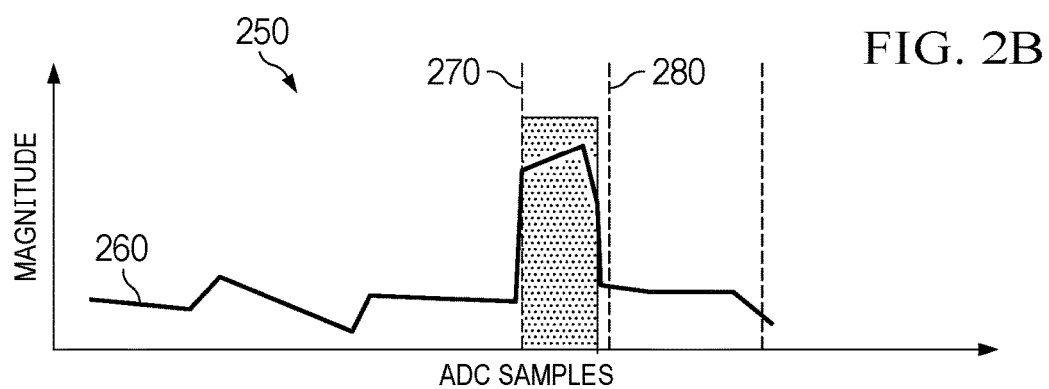
FIG. 2B is a graph of the magnitude of analog-to-digital converter (ADC) samples over time.

FIG. 2B is a graph 250 of the magnitude of analog-to-digital converter (ADC) samples 260 over time. The magnitude of ADC samples 260 represent the digital numbers outputted by an ADC, which in turn represent the magnitude of a sampled analog signal received by an ADC from a receiver. The magnitude of ADC samples 260 is larger between times 270 and 280, as compared to other times in graph 250, because of the interference caused by ramp 220 passing through in-band frequency range 212. The corresponding ADC samples between times 270 and 280 are therefore corrupted because the noise floor has been raised, potentially burying actual reflectors in the noise. Graph 250 is one example of the effect of interference—in some instances, the effect of interference may be less noticeable in the time-domain data.

Even when the effect on the time-domain data is less noticeable, the interference may still impair the detection of objects, especially weak reflectors. In other words, the interference experienced by the receiver between times 270 and 280 impairs the ability to detect objects, especially the detection of weak reflectors when strong reflectors are also present. A weak reflector will show up in the frequency spectrum, except when interference raises the noise floor of the spectrum. Interference can occur for a small portion of a chirp (e.g., ten percent) and still raise the noise floor across the frequency spectrum enough to bury or hide a weak reflector. Weak reflectors may be smaller objects, less reflective objects (e.g., plants or animals), stationary objects, and/or objects that are far away from the ownship vehicle. In contrast, strong reflectors may be larger objects, more reflective objects (e.g., metal or concrete), moving objects, and close-range objects.

Figure 3:
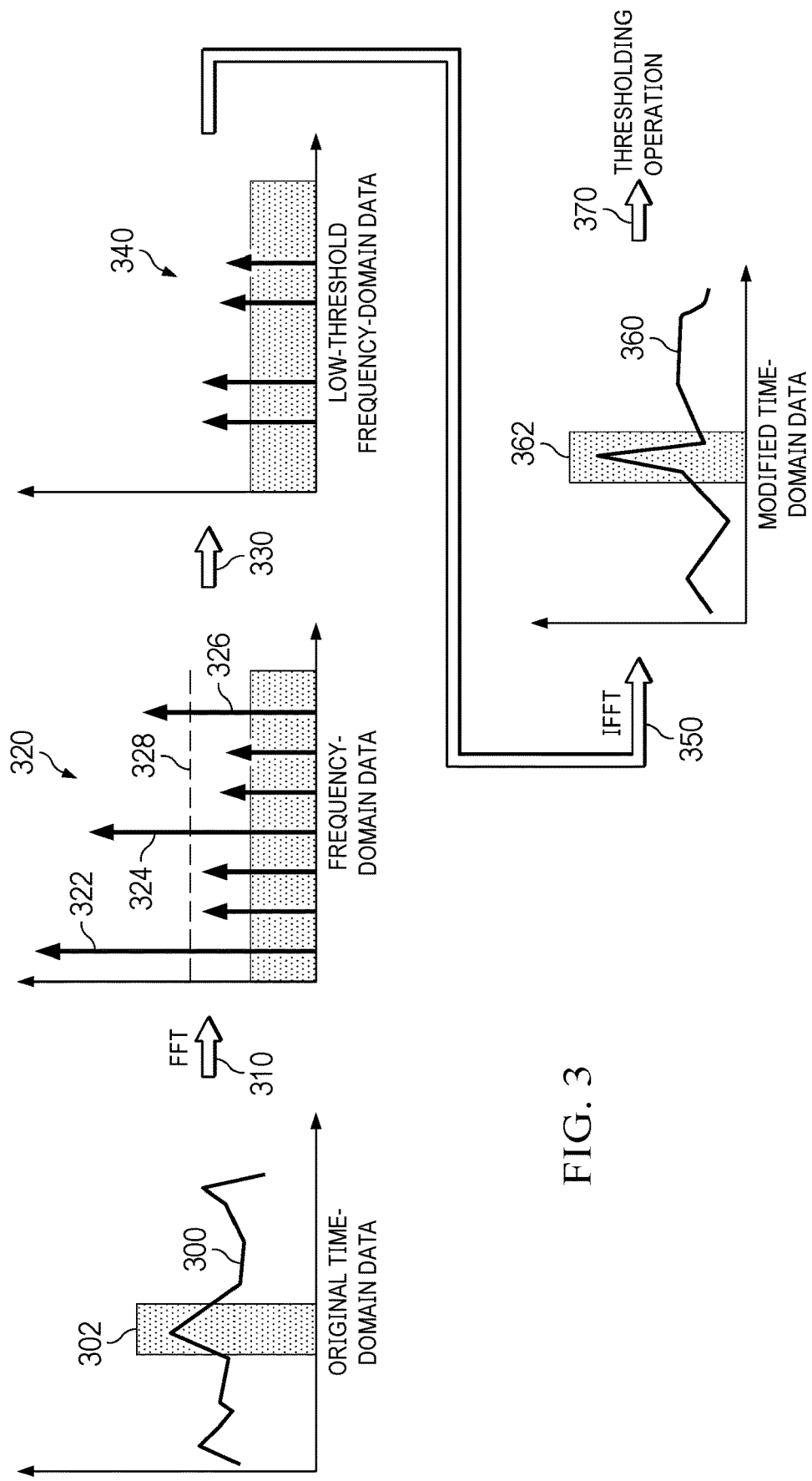
FIGS. 3 and 4 are conceptual diagrams of interference detection processes according to some aspects of the present disclosure.

FIG. 3 is a conceptual diagram of an interference detection process according to some aspects of the present disclosure. Region of interference 302 in FIG. 3 is limited in time and impacts only some of original time-domain data set 300. Although the term "region" is used to describe region of interference 302, region of interference 302 represents a time span (e.g., a set of consecutive ADC samples), rather than a physical area. FIG. 3 depicts a single region of interference, but original time-domain data set 300 may include multiple regions of interference caused by, for example, multiple crossing interferers or a single crossing interferer that interferes twice within a single chirp.

The values of original time-domain data set 300 in region of interference 302 may be higher than other regions, but standard thresholding may not be sufficient to accurately detect the extent of region of interference 302. Instead of merely thresholding time-domain data set 300, the process depicted in FIG. 3 includes converting the data to the frequency domain to remove a portion of spectrum. The process depicted in FIG. 3 includes detecting and eliminating strong reflectors from original time-domain data set 300 to generate modified time-domain data set 360, from which region of interference 302 can be more easily detected.

Processing circuitry may be configured to receive original time-domain data set 300 from an ADC, and the processing circuitry may store original time-domain data set 300 to a memory. The processing circuitry may be configured to perform transform operation 310 (e.g., a Fast Fourier Transform (FFT)) on original time-domain data set 300 to generate frequency-domain data set 320. Although FIGS. 3, 4, and 7-10 show the transform operations as FFT operations, other transform operations such as a Laplace transform or a Z-transform may be used to convert time-domain data to frequency-domain data.

The processing circuitry can perform threshold operation 330 to determine that the magnitude of the frequency bins shown as peaks 322, 324, and 326 are greater than threshold magnitude 328. The processing circuitry may be configured to select the threshold magnitude in one of many ways. For example, the threshold could be a constant across the entire frequency-domain data, with the value of the constant being a certain dB (for example 6 dB) below the highest peak in frequency-domain data set 320. Alternatively the threshold could be an adaptive threshold—selected per frequency bin based on a constant false alarm rate (CFAR) detector. The CFAR detector looks at the average signal value in the vicinity of the frequency bin to determine the threshold. The processing circuitry can determine that peaks 322, 324, and 326 do not satisfy threshold magnitude 328 because the magnitudes associated with peaks 322, 324, and 326 are not less than threshold magnitude 328. Responsive to determining that peaks 322, 324, and 326 do not satisfy threshold magnitude 328, the processing circuitry can perform threshold operation 330 by suppressing or zeroing-out the frequency bins associated with peaks 322, 324, and 326 from frequency-domain data set 320. Zeroing out the frequency bins can lead to abrupt step changes in the signal level in the frequency samples. These abrupt changes can lead to sidelobes in the inverse transform output. In order to reduce such sidelobes, the processing circuitry can optionally use a smoothening window to reduce such abrupt changes.

The strong reflectors associated with peaks 322, 324, and 326 are limited to a few frequency bins in the spectrum while the interference is spread across all frequency bins. In some examples, peak 322 is associated with the bumper of the ownship vehicle. The signals corresponding to the peaks 322, 324 and 326 are present across the entire chirp (i.e., across all ADC samples of the chirp). In contrast, the interference signal may be much weaker than peak 322, and the interference signal may be transitory (e.g., only a few ADC samples are affected).

The processing circuitry performs threshold operation 330 on the frequency-domain data set 320 to generate low-threshold frequency-domain data set 340, which includes the spectrum of frequency-domain data set 320, except for the magnitudes of peaks 322, 324, and 326. The magnitude of peaks 322, 324, and 326 has been zeroed out in low-threshold frequency-domain data set 340. Thus, low-threshold frequency-domain data set 340 includes one or more portions of frequency-domain data set 320, while three portions (i.e., peaks 322, 324, and 326) have been removed.

The processing circuitry may be configured to perform inverse transform 350 on low-threshold frequency-domain data set 340 to generate modified time-domain data set 360. In some examples, time-domain data set 360 has the same number of samples as time-domain data set 300. Although FIGS. 3, 4, and 7-10 show the inverse transform operations as inverse FFT (IFFT) operations, other transform operations such as an inverse Laplace transform, or an inverse Z-transform may be used to convert frequency domain-data to time-domain data. The processing circuitry can perform thresholding operation 370 to identify region of interference 362. For example, the processing circuitry can perform thresholding operation 370 by applying an absolute-value filter or an absolute-value difference filter or any absolute-value high pass filter to modified time-domain data set 360. Thresholding operation 370 may accentuate region of interference 362, making it easier to identify the time period(s) when interference occurs. Thus, the process shown in FIG. 3 may be more accurate and/or reliable in detecting a region of interference, as compared to conventional thresholding.

After region of interference 302 or 362 is identified, the processing circuitry may be configured to repair original time-domain data set 300 by, for example, inserting a reconstructed region into original time-domain data set 300. The processing circuitry can replace a series of consecutive ADC samples of original time-domain data set 300 with the reconstructed region, where the series of samples and the reconstruction region are both associated with the same time duration. After repairing original time-domain data set 300, the processing circuitry can detect objects based on the repaired data.

The detection processes shown in FIGS. 3, 4, and 7-10 can be used on a per-chirp basis, meaning that the detection process does not need the data from multiple chirps before implementing the detection process. Processing circuitry can perform a detection process shown in any of FIGS. 3, 4, and 7-10 after receiving each chirp. The processing circuitry may be able to perform the detection process without any history information beyond the boundaries of the chirp. Alternatively, the processing circuitry can compile the data from multiple chirps and perform a detection process shown in any of FIGS. 3, 4, and 7-10 on the compiled data. Moreover, the detection processes shown in FIGS. 3, 4, and 7-10 may be reliable even when there are multiple targets at different velocities in the same range bin.

Figure 4:
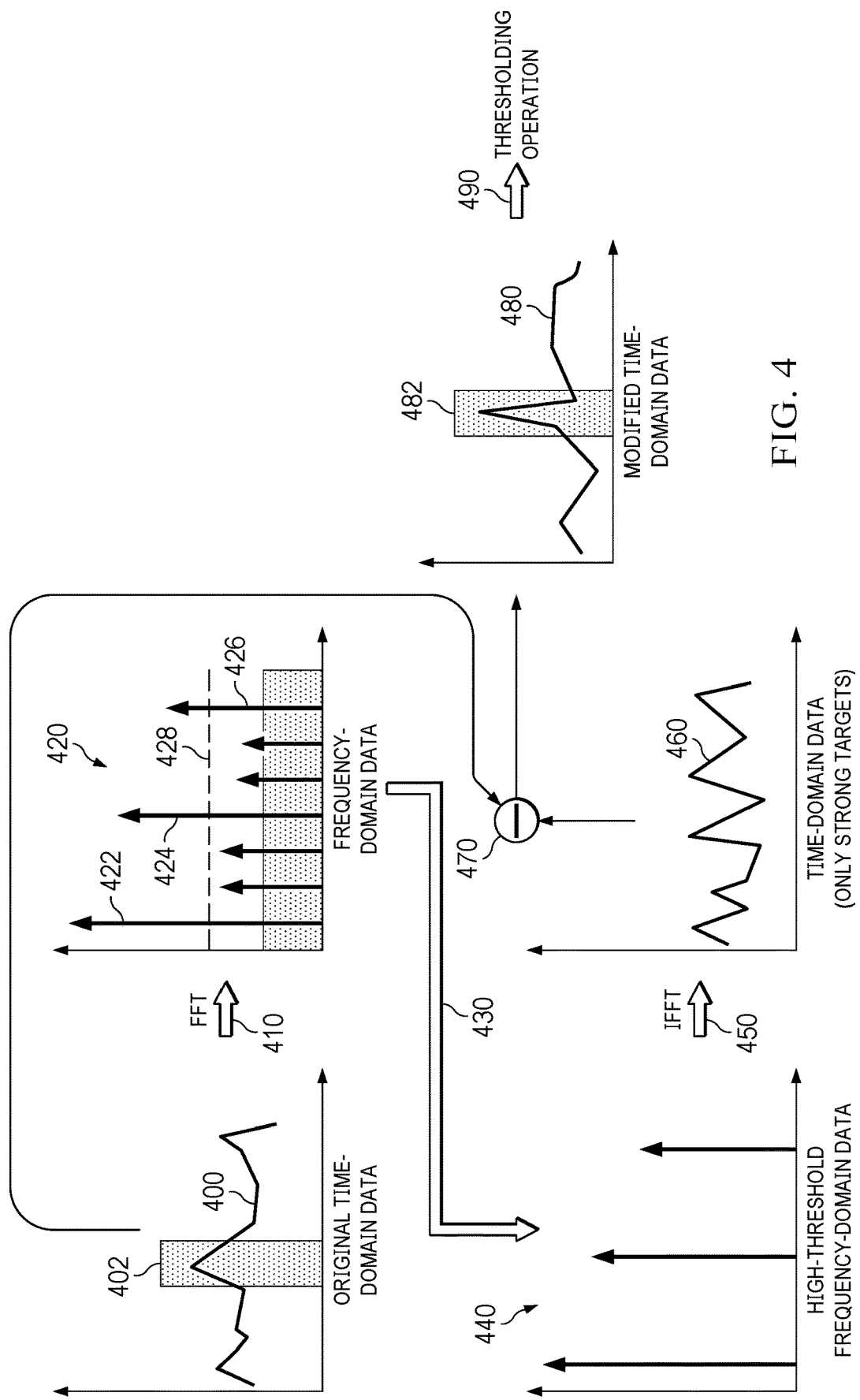

FIG. 4 is a conceptual diagram of an interference detection process according to some aspects of the present disclosure. The process depicted in FIG. 4 includes detecting and eliminating weak reflectors from original time-domain data set 400 to generate modified time-domain data set 480, from which region of interference 402 can be more easily detected. Time-domain data set 480 is generated by performing subtraction operation 470 on time-domain data sets 400 and 460.

Processing circuitry may be configured to perform transform operation 410 on original time-domain data set 400 to generate frequency-domain data set 420. The processing circuitry can perform threshold operation 430 to determine that peaks 422, 424, and 426 are greater than threshold magnitude 428. In some examples, the processing circuitry can determine that peaks 422, 424, and 426 satisfy threshold magnitude 428 because the magnitudes associated with peaks 422, 424, and 426 are greater than threshold magnitude 428. Responsive to determining that peaks 422, 424, and 426 satisfy threshold magnitude 428, the processing circuitry can perform threshold operation 430 by zeroing-out all of the other frequency bins that are not associated with peaks 422, 424, and 426. In some examples, threshold operation 430 is an inverted form of threshold operation 330 shown in FIG. 3. In order to reduce such sidelobes, the processing circuitry can optionally use a smoothening window during the zeroing-out operation.

The processing circuitry performs threshold operation 430 on the frequency-domain data set 420 to generate high-threshold frequency-domain data set 440, which includes only peaks 422, 424, and 426. The magnitude of all other frequency components has been zeroed out in high-threshold frequency-domain data set 440. The processing circuitry may be configured to perform inverse transform 450 on high-threshold frequency-domain data set 440 to generate modified time-domain data set 460. The processing circuitry performs subtraction operation 470 to generate time-domain data set 480 by subtracting time-domain data set 460 from original time-domain data set 400. Then, the processing circuitry can perform thresholding operation 490 to identify region of interference 482 in time-domain data set 480.

After region of interference 402 or 482 is identified, the processing circuitry may be configured to repair original time-domain data set 400 by, for example, inserting a reconstructed region into original time-domain data set 400. Although the detection process shown in FIG. 4 includes more steps than the process shown in FIG. 3, the process shown in FIG. 4 may be advantageous for detecting the objects associated with peaks 422, 424, and 426, and generating a reconstructed region based on time-domain data set 460. After repairing original time-domain data set 400, the processing circuitry can detect objects based on the repaired data.

Figure 5A:
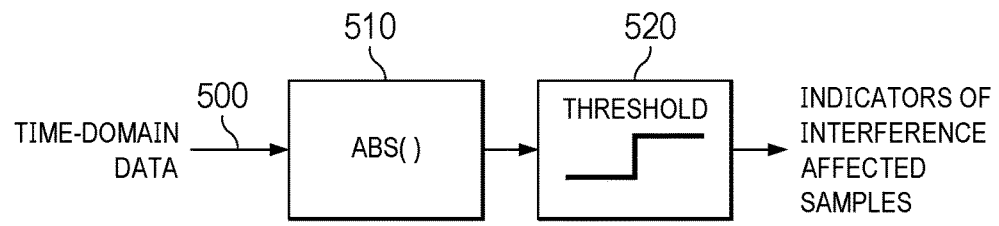
FIGS. 5A and 5B are conceptual block diagrams of two thresholding operations according to some aspects of the present disclosure.
Figure 5B:
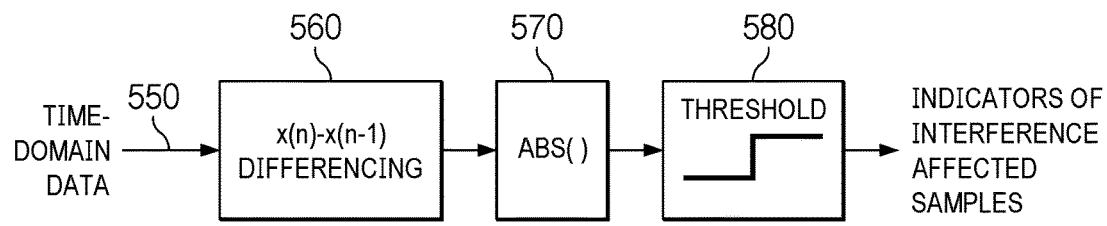

FIGS. 5A and 5B are conceptual block diagrams of two thresholding operations according to some aspects of the present disclosure. Although the thresholding operations of FIGS. 5A and 5B are described as being performed on time-domain data, these thresholding operations may be performed on frequency-domain data. For example, thresholding operations 330, 430, 725, 825, 925, and/or 1025 are performed on frequency-domain data. Thresholding operations 330, 430, 725, 825, 925, and/or 1025 can include one or more of the steps of the thresholding operations shown in FIGS. 5A and 5B.

In FIG. 5A, processing circuitry performs absolute-value operation 510 and threshold operation 520 on time-domain data 500. Each value of time-domain data 500 may be a complex value or just a signed value, where the absolute value of a complex value is equal to the square root of the sum of squares of the real and complex units. The output of absolute-value operation 510 may be a filtered time-domain data set consisting of the absolute value of the input. Processing circuitry may be configured to compare the output of absolute-value operation 510 to a threshold magnitude to identify the region of interference. In some examples, the magnitude of the ADC samples in the region of interference are greater than the ADC sample values in other regions because a crossing interferer (e.g., a nearby transmitter) elevates the noise floor, allowing for detection using absolute-value operation 510 and threshold operation 520.

In FIG. 5B, processing circuitry performs differencing operation 560, absolute-value operation 570, and threshold operation 580 on time-domain data 550. Processing circuitry may be configured to perform differencing operation 560 by subtracting each ADC sample value from a previous or subsequent ADC sample value to generate a differential time-domain data set. Alternatively, differencing operation 560 may be implemented as $x(n)-x(n-A)$, where A is any integer other than zero.

Performing the thresholding operations shown in FIGS. 5A or 5B alone may allow for the identification of regions of strong interference in the absence of any strong reflectors. However, in the presence of a large number of objects (e.g., an urban environment) or strong reflectors, or when the interference is relatively weak, the thresholding operations shown in FIGS. 5A or 5B alone may not be sufficient for identifying regions of interference, or the interference may be barely detectable. A region of relatively weak interference may not stand out in time-domain data 500 or 550. To more effectively identify a region of interference, processing circuitry may perform the transform operations and threshold operations shown in FIG. 3 or 4 before performing the thresholding operations shown in FIGS. 5A or 5B. Thus, the processing circuitry may be configured to perform the thresholding operations shown in FIGS. 5A or 5B on modified time-domain data set 360 or 480, rather than on original time-domain data set 300 or 400.

Figure 6:
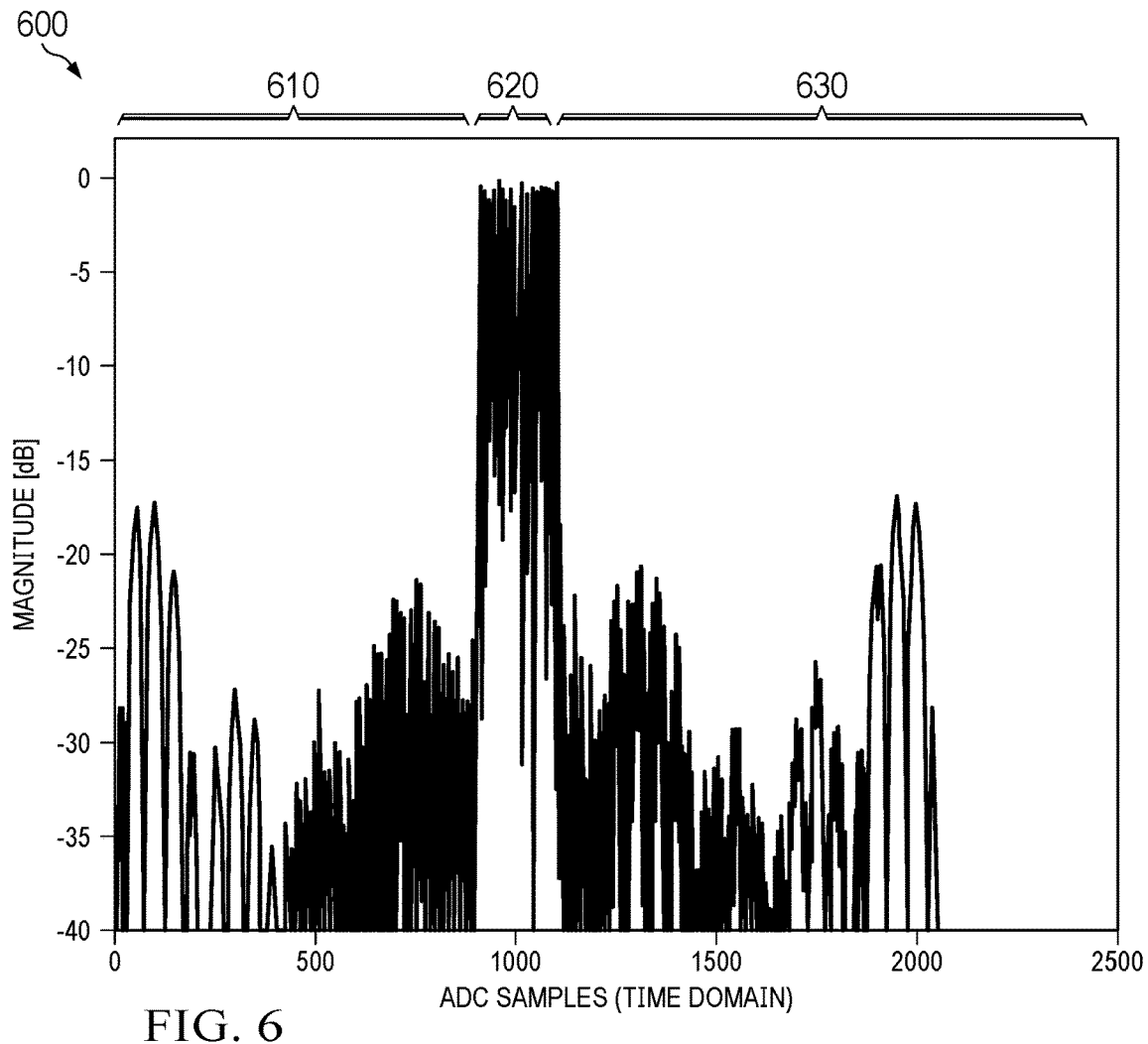
FIG. 6 is a graph of the magnitude of a set of ADC samples showing a region of interference according to some aspects of the present disclosure.

FIG. 6 is a graph 600 of the magnitudes (logarithmic representation) of a set of ADC samples showing a region of interference according to some aspects of the present disclosure. The ADC samples shown in graph 600 may be the output of a thresholding operation, such as the thresholding operations shown in FIG. 5B. As shown in FIG. 6, graph 600 includes three regions: region 610 encompassing approximately the first nine hundred ADC samples, region 620 encompassing approximately the next two hundred ADC samples, and region 630 encompassing approximately the final one thousand ADC samples. The ADC samples in regions 610 and 630 have magnitudes of less than negative fifteen dB. In contrast, some of the ADC samples in region 620 have magnitudes greater than negative five dB. This difference in ADC sample magnitudes creates a clearly detectable region of interference corresponding to region 620.

The frequency components associated with strong reflectors have been removed from the frequency spectrum of the ADC samples shown in graph 600. For example, processing circuitry may have performed a transform operation on the original ADC samples to generate a frequency-domain data set. The processing circuitry may have then identified and removed strong reflectors from the frequency-domain data set by performing a threshold operation to generate a modified frequency-domain data set. The processing circuitry could have generated the ADC samples shown in graph 600 by performing an inverse transform operation on the modified frequency-domain data set.

FIGS. 7-10 are conceptual diagrams of interference detection and repair processes according to some aspects of the present disclosure. The processes depicted in FIGS. 7-10 include detecting and eliminating strong reflectors from original time-domain data sets 700, 800, 900, and 1000 to make it easier to detect one or more regions of interference. Even though the magnitude of ADC samples in a region of interference may be higher than other regions, conventional thresholding alone may not be sufficient to accurately detect the region of interference. FIGS. 7-10 depicts four example processes for identifying and repairing a region of interference.

Figure 7:
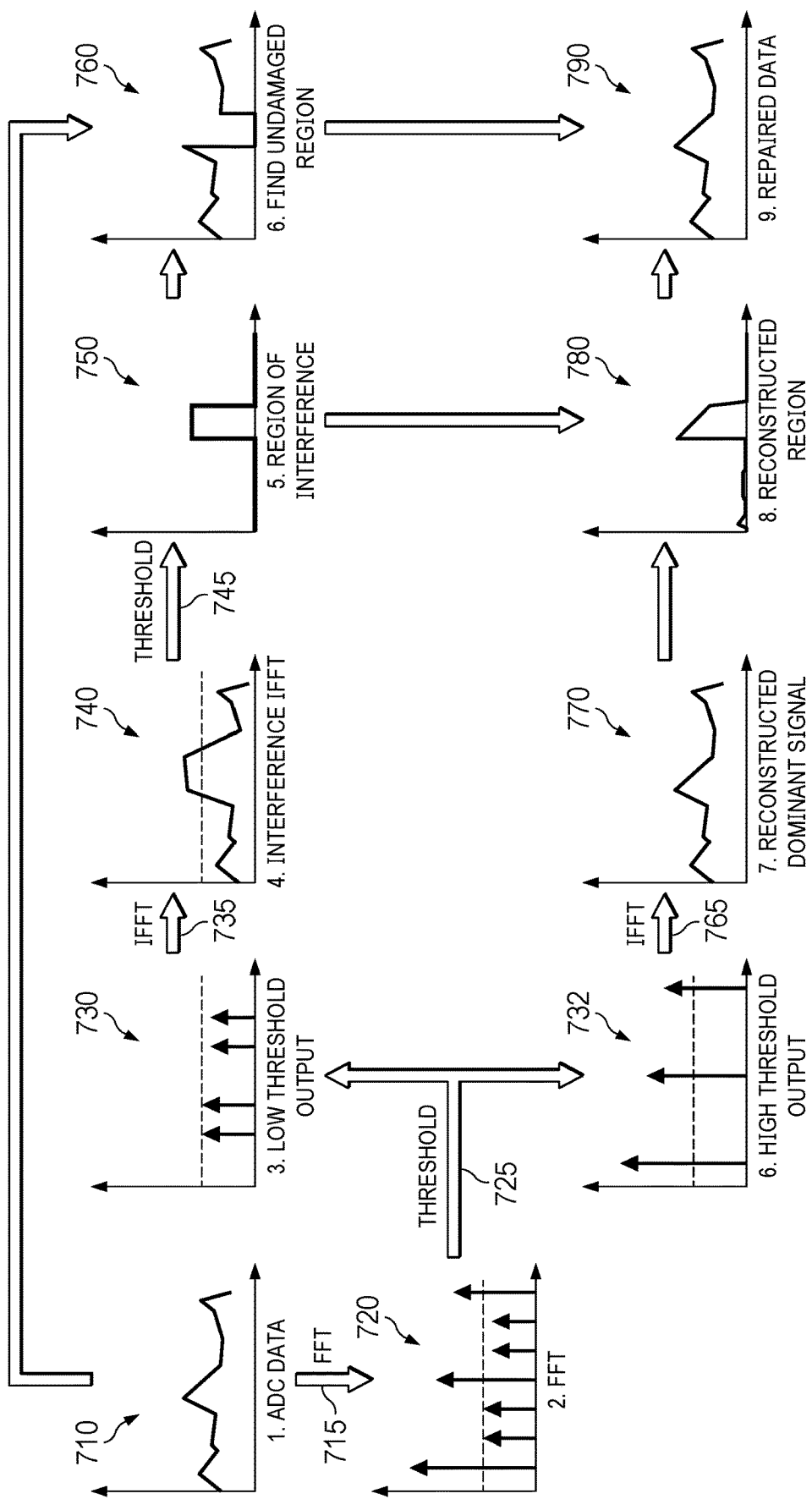
FIGS. 7-10 are conceptual diagrams of interference detection and repair processes according to some aspects of the present disclosure.

In the example shown in FIG. 7, processing circuitry receives original time-domain data set 710 from one or more ADCs. The processing circuitry performs transform operation 715 on original time-domain data set 710 to generate frequency-domain data set 720. The processing circuitry then performs threshold operation 725 to generate frequency-domain data sets 730 and 732. The processing circuitry can identify frequency-domain data set 730 based on threshold operation 725 in frequency-domain data set 720. The processing circuitry can identify a remaining portion of frequency-domain data set 720 as frequency-domain data set 732. Frequency-domain data set 730 includes data for the frequency bins with magnitudes less than, or less than or equal to, the threshold magnitude. Frequency-domain data set 730 may include the frequency components of weak reflectors and interference. Frequency-domain data set 732 includes data for the frequency bins with magnitudes greater than, or greater than or equal to, the threshold magnitude. Frequency-domain data set 732 may include the frequency components of strong reflectors.

The processing circuitry can perform inverse transform operation 735 on frequency-domain data set 730 to generate time-domain data set 740. The processing circuitry can perform inverse transform operation 765 on frequency-domain data set 732 to generate time-domain data set 770. Each of time-domain data sets 740 and 770 may be a portion of original time-domain data set 710, such that original time-domain data set 710 is the sum of the corresponding values of time-domain data sets 740 and 770.

The processing circuitry may be configured to then perform thresholding operation 745 on time-domain data set 740 to identify region of interference 750. The processing circuitry can generate interference indicator bits to identify the ADC samples that may have been affected by interference. To identify region of interference 750, the processing circuitry determines one or more portions of time-domain data set 740 that satisfies a threshold. Additionally or alternatively, the processing circuitry can perform the thresholding operation shown in FIG. 5A or the thresholding operation shown in FIG. 5B to identify region of interference 750. The processing circuitry can perform an averaging operation, a low-pass filtering operation, and/or a smoothing operation before performing the threshold operation shown in FIG. 5A or 5B.

After identifying region of interference 750, the processing circuitry can generate undamaged portion 760, which is the portion of original time-domain data set 710 that does not include the data points associated with region of interference 750. The processing circuitry may be configured to generate undamaged portion 760 by setting the ADC samples associated with region of interference 750 to zero in original time-domain data set 710. The processing circuitry can use region of interference 750 to generate reconstructed region 780 by identifying the data points in time-domain data set 770 that correspond to the data points associated with region of interference 750. As just one example, if each of time-domain data sets 710, 740, and 770 include two thousand data points or ADC samples, and region of interference 750 covers two hundred consecutive data points from the nine hundredth to eleven hundredth points (see FIG. 6), the processing circuitry can generate reconstructed region 780 by storing the two hundred consecutive data points in time-domain data set 770 from the nine hundredth to eleven hundredth points.

The processing circuitry can generate repaired time-domain data set 790 by inserting reconstructed region 780 into undamaged portion 760. In some examples, the processing circuitry generates repaired time-domain data set 790 by replacing region of interference 750 of original time-domain data set 710 with reconstructed region 780. The processing circuitry may simply swap out region of interference 750 in original time-domain data set 710 for reconstructed region 780 to generate repaired time-domain data set 790 without separately generating undamaged portion 760.

In some examples, repaired time-domain data set 790 is identical to original time-domain data set 710, except for the data points corresponding to region of interference 750. For each data point corresponding to region of interference 750, the time-domain value may be equal to the corresponding value in original time-domain data set 710 minus the corresponding value in time-domain data set 740. The value of time-domain data set 740 for each data point in region of interference 750 is an approximation of the signal strength attributable to the interferer.

Figure 8:
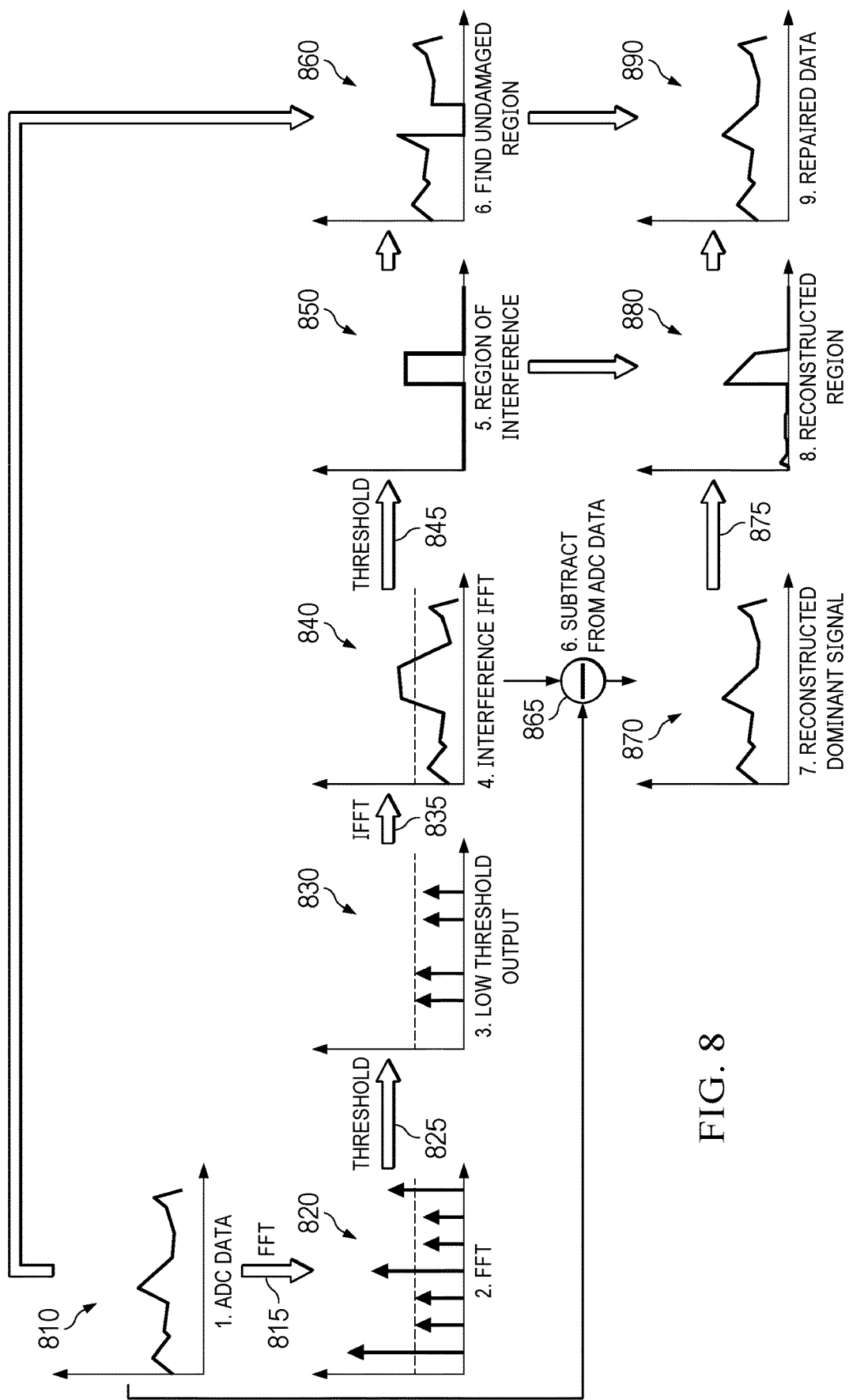

FIG. 8 is a conceptual diagram of an interference detection and repair process including a single inverse transform operation 835, whereas the process shown in FIG. 7 included two inverse transform operations 735 and 765. In the example shown in FIG. 8, processing circuitry performs transform operation 815 on original time-domain data set 810 to generate frequency-domain data set 820. The processing circuitry then performs threshold operation 825 on frequency-domain data set 820 to generate frequency-domain data set 830, which may include the frequency components of weak reflectors and interference. In the example shown in FIG. 8, unlike the example shown in FIG. 7, the processing circuitry does not generate a frequency-domain data set including the frequency components of strong reflectors (e.g., frequency-domain data set 732). The processing circuitry can perform inverse transform operation 835 on frequency-domain data set 830 to generate time-domain data set 840.

The processing circuitry performs subtraction operation 865 by subtracting time-domain data set 840 from original time-domain data set 810 to generate time-domain data set 870. Each of time-domain data sets 840 and 870 may be a portion of original time-domain data set 810, such that original time-domain data set 810 is the sum of the corresponding values of time-domain data sets 840 and 870. The processing circuitry may be configured to then perform thresholding operation 845 on time-domain data set 840 to identify region of interference 850.

After identifying region of interference 850, the processing circuitry can generate undamaged portion 860 by zeroing out the values of the data points in original time-domain data set 810 that are associated with region of interference 850. The processing circuitry can generate reconstructed region 880 by identifying the data points in time-domain data set 870 that correspond to the data points associated with region of interference 850. The processing circuitry can generate repaired time-domain data set 890 by inserting reconstructed region 880 into undamaged portion 860 or into original time-domain data set 810. In some examples, the processing circuitry generates repaired time-domain data set 890 by replacing, with reconstructed region 880, the data points of original time-domain data set 810 that are associated with region of interference 850.

The interference detection and repair process shown in FIG. 8 may be less computationally intensive than the interference detection and repair process shown in FIG. 7. For example, the process shown in FIG. 8 includes only one inverse transform operation 835, whereas the process shown in FIG. 7 includes two inverse transform operations 735 and 765. The process shown in FIG. 8 includes subtraction operation 865 instead of inverse transform operation 765, and subtraction operation 865 has lower computational overhead than inverse transform operation 765. In addition, the process shown in FIG. 8 may also have lower latency than the process shown in FIG. 7 because fewer operations are performed in FIG. 8.

Figure 9:
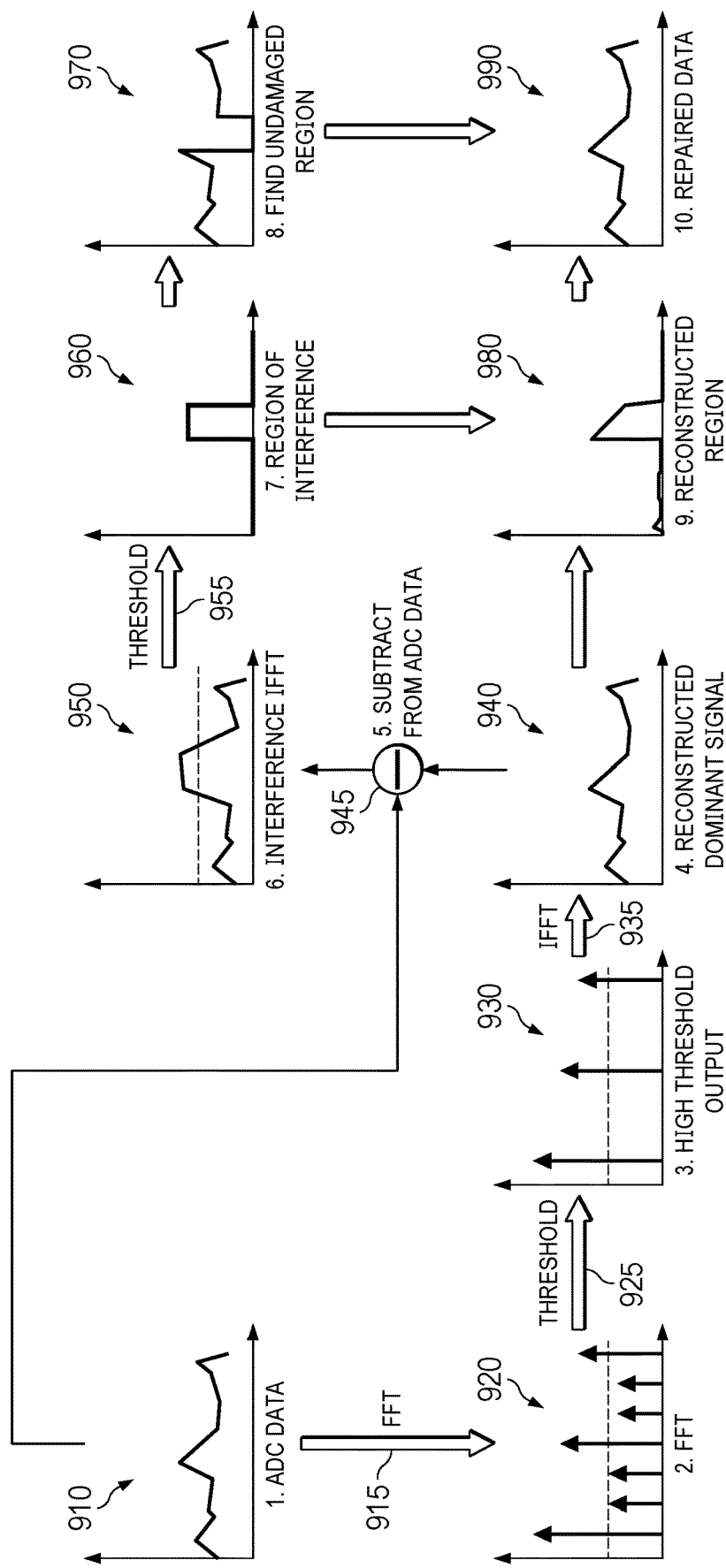

FIG. 9 is a conceptual diagram of an interference detection and repair process including a single inverse transform operation 935. Inverse transform operation 935 is performed on high-threshold frequency-domain data, whereas inverse transform operation 835 in FIG. 8 is performed on low-threshold frequency-domain data. In the example shown in FIG. 9, processing circuitry performs transform operation 915 on original time-domain data set 910 to generate frequency-domain data set 920. The processing circuitry then performs threshold operation 925 on frequency-domain data set 920 to generate frequency-domain data set 930, which may include the frequency components of strong reflectors. The processing circuitry can perform inverse transform operation 935 on frequency-domain data set 930 to generate time-domain data set 940.

The processing circuitry performs subtraction operation 945 by subtracting time-domain data set 940 from original time-domain data set 910 to generate time-domain data set 950. The processing circuitry may be configured to then perform thresholding operation 955 on time-domain data set 950 to identify region of interference 960. After identifying region of interference 960, the processing circuitry can generate undamaged portion 970 by zeroing out the values of the data points in original time-domain data set 910 that are associated with region of interference 960. The processing circuitry can generate repaired time-domain data set 990 by inserting reconstructed region 980 into undamaged portion 970 or into original time-domain data set 910.

Figure 10:
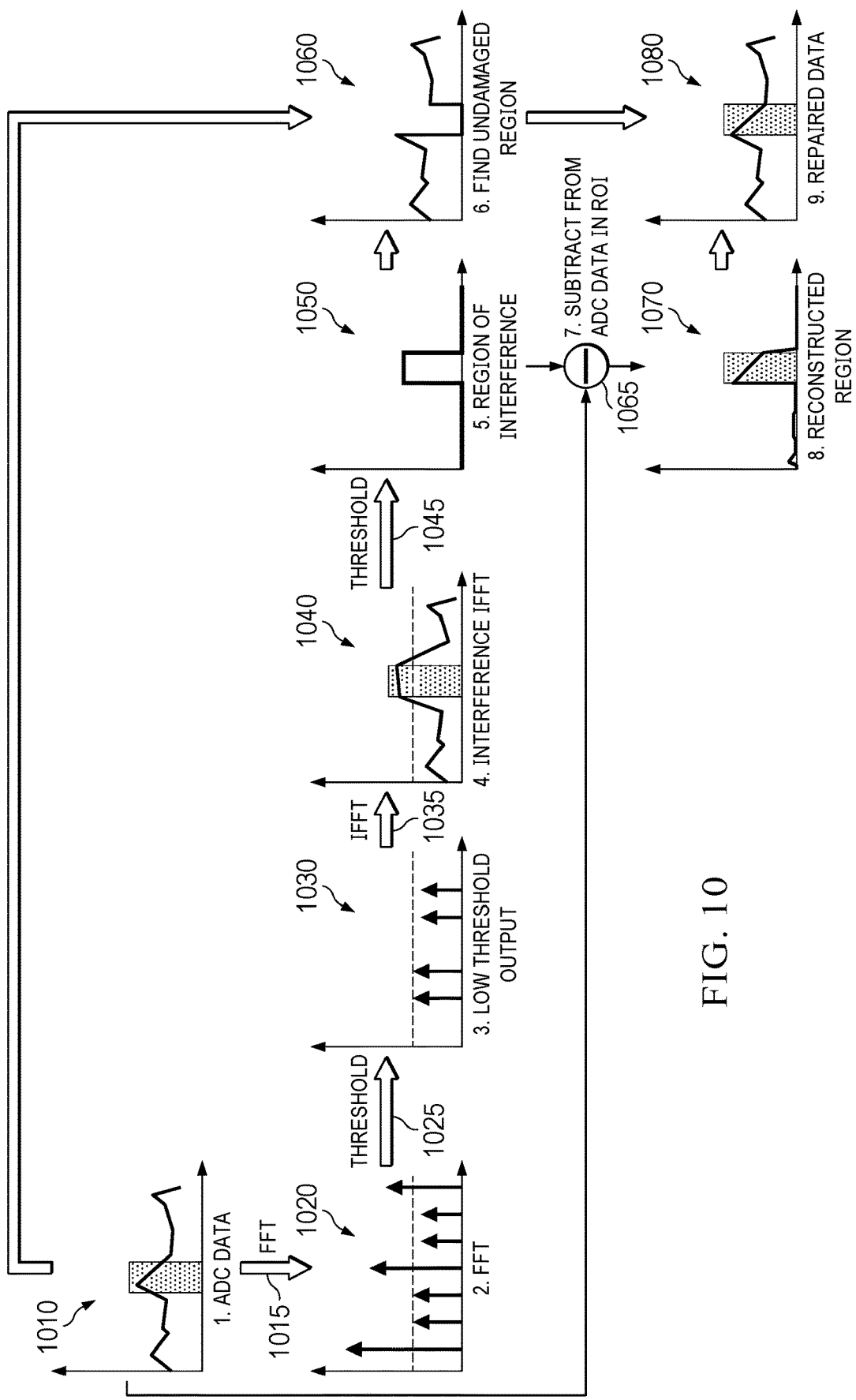

FIG. 10 is a conceptual diagram of an interference detection and repair process including a single inverse transform operation 1035. In addition, the process shown in FIG. 10 generates reconstructed region 1070 without generating an entire reconstructed dominant signal (e.g., time-domain data set 770, 870, or 940) In the example shown in FIG. 10, processing circuitry performs transform operation 1015 on original time-domain data set 1010 to generate frequency-domain data set 1020. The processing circuitry then performs threshold operation 1025 on frequency-domain data set 1020 to generate frequency-domain data set 1030, which may include the frequency components of weak reflectors and interference. The processing circuitry also performs inverse transform operation 1035 on frequency-domain data set 1030 to generate time-domain data set 1040.

The processing circuitry may be configured to then perform thresholding operation 1045 on time-domain data set 1040 to identify region of interference 1050. After identifying region of interference 1050, the processing circuitry can generate undamaged portion 1060 by zeroing out the values of the data points in original time-domain data set 1010 that are associated with region of interference 1050. The processing circuitry can perform subtraction operation 1065 to generate reconstructed region 1070 by subtracting the values of time-domain data set 1040 within region of interference 1050 from the values of the corresponding data points in original time-domain data set 1010. The processing circuitry can generate repaired time-domain data set 1080 by inserting reconstructed region 1070 into undamaged portion 1060 or into original time-domain data set 1010.

The interference detection and repair process shown in FIG. 10 may be less computationally intensive with lower computational overhead than the interference detection and repair processes shown in FIGS. 7-9. For example, the process shown in FIG. 10 includes only one inverse transform operation 1035 and does not generate an entire time-domain data set for the strong reflectors. In contrast, the process shown in FIG. 8 generates time-domain data set 840 for weak reflectors and interference and generates time-domain data set 870 for strong reflectors. Likewise, the process shown in FIG. 9 generates time-domain data set 940 for strong reflectors and generates time-domain data set 950 for weak reflectors and interference. The process shown in FIG. 10 may also have lower latency than the processes shown in FIGS. 7-9 because fewer operations are performed in the process shown in FIG. 10.

Figure 11:
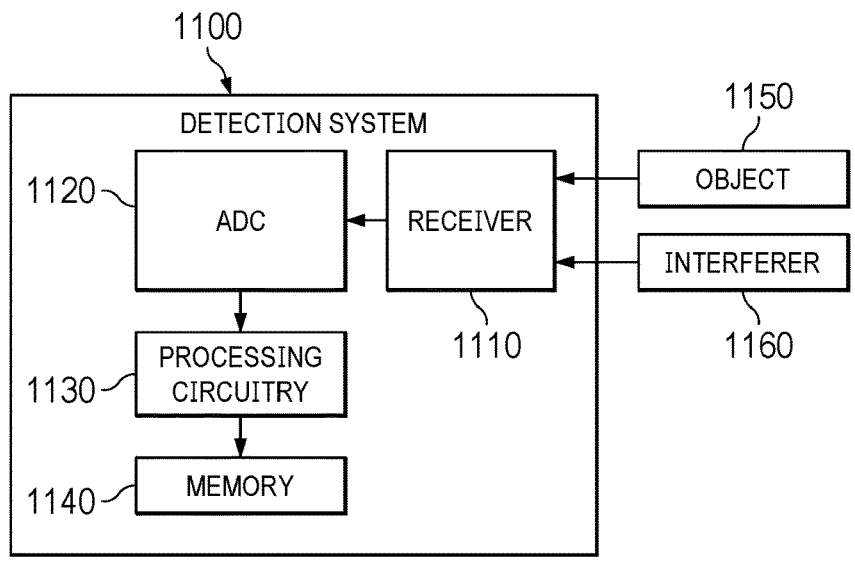
FIG. 11 is a conceptual block diagram of a detection system according to some aspects of the present disclosure.

FIG. 11 is a conceptual block diagram of a detection system 1100 according to some aspects of the present disclosure. In the example system of FIG. 11, detection system 1100 includes receiver 1110, ADC 1120, processing circuitry 1130, and memory 1140. Detection system 1100 may also include other components not shown in FIG. 11, such as additional receivers, one or more transmitters, and/or any other additional components. Detection system 1100 may be configured to be installed in a larger system, such as an automobile, aircraft, marine vehicle, industrial facility, or robot (e.g., robotic arm).

Receiver 1110 is configured to receive signals from object 1150 and interferer 1160 via one or more antennas. The one or more antennas may be part of receiver 1110 or external to detection system 1100. Receiver 1110 may include components such as an amplifier, an analog filter, a mixer (e.g., for down-conversion), and/or a local oscillator circuit. The signals received by receiver 1110 may include or be a combination of the signals reflected off and/or transmitted by object 1150 and interferer 1160. In this disclosure, receiver 1110 may also be referred to as a sensor because receiver 1110 senses signals transmitted by or reflected off object 1150 and interferer 1160.

ADC 1120 is configured to sample an analog signal received by ADC 1120 from receiver 1110. ADC 1120 may receive and convert the analog signals from receiver 1110 into a digitized stream of data. The digitized stream of data may include information on the location and velocity of different objects within the field of view of receiver 1110, such as object 1150 and interferer 1160.

Processing circuitry 1130 may be configured to process the digital samples outputted by ADC 1120 to detect object 1150 and/or interferer 1160. For example, processing circuitry 1130 may be configured to identify and isolate each object or target by identifying range, velocity and angle of each object based on the digital numbers received from ADC

1120. Processing circuitry 1130 may be configured to perform the detection process(es) shown in FIGS. 3, 4, 7, 8, 9, and/or 10. For example, processing circuitry 1130 may be configured to perform transform operation(s), threshold operation(s), inverse transform operation(s), thresholding operation(s) filtering operation(s), subtraction operation(s), and/or insertion operation(s) to detect interference and repair a data set affected by interference.

Memory 1140 may be coupled to processing circuitry 1130 via a bus. Memory 1140 may include instruction memory for storing instructions that are executable by processing circuitry 1130. For example, the instruction stored by memory 1140 include performing one or more functions such as the performance of transform, threshold, inverse transform, thresholding, filtering, subtraction, and/or insertion operations. Memory 1140 may also include data memory for storing time-domain data sets and frequency-domain data sets.

Object 1150 may be a moving object or a stationary object, such as a vehicle, a person, an animal, a building, debris, or terrain. Interferer 1160 may also be a moving object or a stationary object with a transmitter or other noise generating device. In some examples, interferer 1160 generates electromagnetic energy in the frequency band of interest to receiver 1110. In the example of automotive radar, receiver 1110 may operate in a frequency band from seventy-six or seventy-seven gigahertz to eighty-one gigahertz. Although this disclosure describes techniques for detecting interference, detection system 1100 may be configured to also detect periods of noise (e.g., white noise) experienced by receiver 1110.

Figure 12:
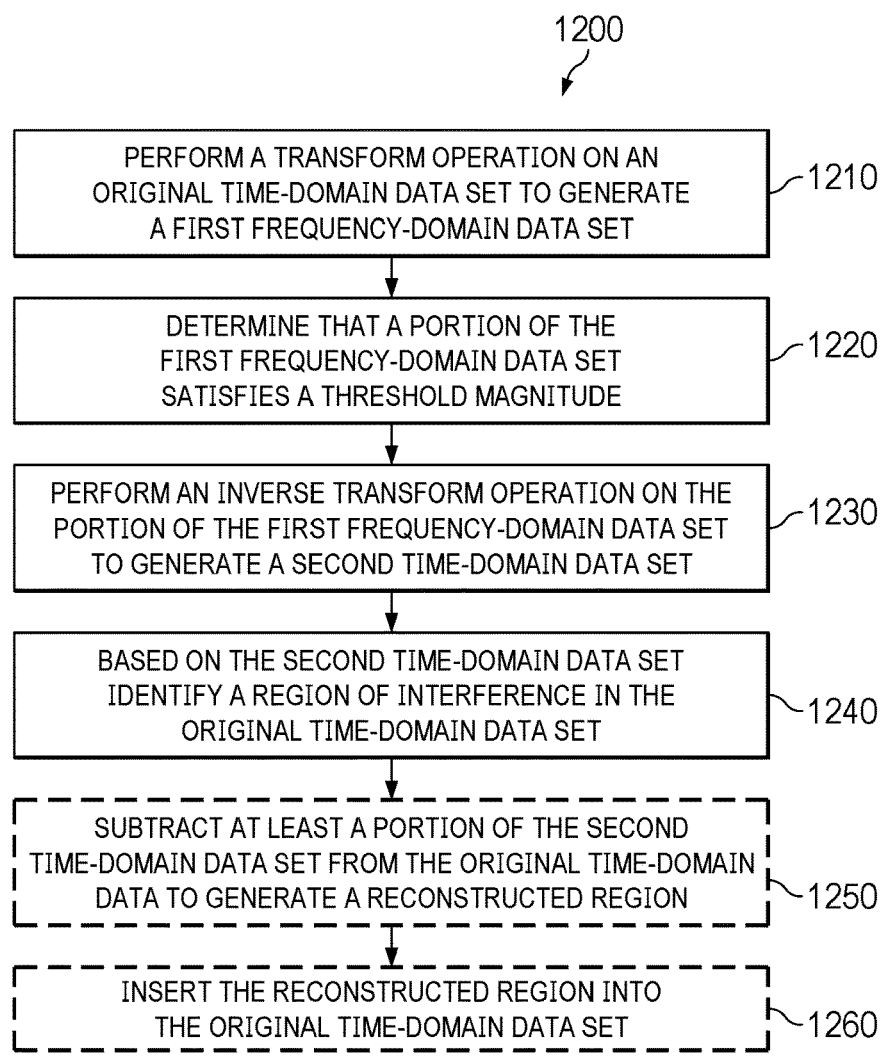
FIG. 12 is a flow diagram of a method of detecting interference according to some aspects of the present disclosure.

FIG. 12 is a flow diagram of a method of detecting interference according to some aspects of the present disclosure. Some processes of the method 1200 may be performed in orders other than described, and many processes may be performed concurrently in parallel. Furthermore, processes of the method 1200 may be omitted or substituted in some examples of the present disclosure. The method 1200 is described with reference to the operations shown in FIG. 10 being performed by detection system 1100 shown in FIG. 11, although other components such as vehicle 100 shown in FIG. 1 may exemplify similar techniques.

Referring to block 1210, processing circuitry 1130 performs transform operation 1015 on original time-domain data set 1010 to generate frequency-domain data set 1020. After receiving original time-domain data set 1010 from ADC 1120, processing circuitry 1130 may be configured to store original time-domain data set 1010 to the data memory of memory 1140. Processing circuitry 1130 can perform transform operation 1015 by implementing instructions stored in memory 1140. Each data point of frequency-domain data set 1020 may associate a frequency bin (e.g., a range of frequencies) with a magnitude representing the signal strength received by receiver 1110 at that frequency or range of frequencies. Processing circuitry 1130 may be configured to also store frequency-domain data set 1020 to the data memory of memory 1140 after performing transform operation 1015.

Referring to block 1220, processing circuitry 1130 determines that a portion of frequency-domain data set 1020 satisfies a threshold magnitude. Processing circuitry 1130 can perform threshold operation 1025 by comparing the magnitude of each data point of frequency-domain data set 1020 to a threshold magnitude. Processing circuitry 1130 generates frequency-domain data set 1030 by isolating the data points of frequency-domain data set 1020 that satisfy or do not satisfy the threshold magnitude. For example, processing circuitry 1130 can determine that each data point of frequency-domain data set 1030 is less than the threshold magnitude. By isolating the data points that are less than the threshold magnitude, processing circuitry 1130 can generate frequency-domain data set 1030 using frequency-domain data set 1020. Frequency-domain data set 1030 is a portion of frequency-domain data set 1020 because frequency-domain data set 1030 includes fewer than all of the data points of frequency-domain data set 1020.

Referring to block 1230, processing circuitry 1130 performs inverse transform operation 1035 on frequency-domain data set 1030 to generate time-domain data set 1040. Processing circuitry 1130 can perform inverse transform operation 1035 by implementing an IFFT process on frequency-domain data set 1030. Time-domain data set 1040 may have the same number of data points as original time-domain data set 1010 because time-domain data set 1040 may cover the same time span (e.g., the time duration of a radar chirp). The values of some or all of the data points may be different in time-domain data sets 1010 and 1040. The amplitude of time-domain data set 1040 may approximately represent the amplitude or strength of signals received by receiver 1110 from weak reflectors and interferers (e.g., interferer 1160). The amplitude or strength of signals received by receiver 1110 from strong reflectors (e.g., object 1150) may be absent from time-domain data set 1040.

Referring to block 1240, processing circuitry 1130 identifies region of interference 1050 in time-domain data set 1010 based on time-domain data set 1040. Region of interference 1050 is a span of data points in time-domain data set 1010 and/or 1040 that were possibly affected by interference or noise. Region of interference 1050 may be a portion of time-domain data set 1040 with relatively large magnitude values. These large magnitude values indicate that the signals received by receiver 1110 from interferer 1160 during the time duration associated with region of interference 1050 were within a frequency band of interest to detection system 1100, as discussed with respect to continuous-wave radar in FIG. 2.

In some examples, processing circuitry 1130 performs thresholding operation 1045 by determining the absolute value associated with each data point. In addition, to implement filtering operation 1045, processing circuitry 1130 may be configured to perform a differencing operation on time-domain data set 1040 (e.g., similar to taking a time-derivative) and/or perform a smoothing operation. Processing circuitry 1130 can perform thresholding operation 1045 by comparing the resulting data points to a threshold magnitude. Processing circuitry 1130 can identify region of interference 1050 by identifying the data points in time-domain data set 1040 with relatively large absolute values or by identifying data points in the first difference of the time-domain data with relatively large absolute values. Processing circuitry 1130 may be configured to identify these data points by comparing these points to threshold. This threshold can be constant across the entire data set, or it can be variable, being set by a CFAR detector. If the threshold is constant, processing circuitry 1130 can derive the threshold from the mean values of the data points or from the mean absolute values of the first difference of the data points.

Referring to optional repair block 1250, processing circuitry 1130 subtracts at least a portion of time-domain data set 1040 from time-domain data set 1010 to generate reconstructed region 1070. Processing circuitry 1130 can perform subtraction operation 1065 by subtracting the value of each data point in time-domain data set 1040 that is associated with region of interference 1050 from each corresponding data point in time-domain data set 1010 (e.g., each data point in time-domain data set 1010 that is associated with region of interference 1050). Reconstructed region 1070 may include only data points within region of interference 1050, while other data points outside of region of interference 1050 may be excluded from reconstructed region 1070 or have values set to zero or some other value.

Referring to optional repair block 1260, processing circuitry 1130 inserts reconstructed region 1070 into original time-domain data set 1010. In some examples, processing circuitry 1130 generates repaired time-domain data set 1080 by replacing a portion of time-domain data set 1010 with reconstructed region 1070. Processing circuitry 1130 can generate repaired time-domain data set 1080 by setting each time-domain value in region of interference 1050 of original time-domain data set 1010 to the time-domain value of the corresponding data point in reconstructed region 1070. Processing circuitry 1130 may be configured to refrain from modifying the data points of original time-domain data set 1010 outside of region of interference 1050 because those data points may not have been affected by the signals transmitted by interferer 1160.

The signals received by receiver 1110 within region of interference 1050 may be the only signals that processing circuitry 1130 has identified as affected by interferer 1160. As discussed with respect to FIG. 2, interferer 1160 may have transmitted signals during the entire time duration represented by time-domain data set 1010, but the frequency of the transmitted signals may overlap with the frequency band of interest to detection system 1100 only during the time duration represented by region of interference 1050. Thus, the data points outside region of interference 1050 may not need any repair.

Processing circuitry 1130 may be configured to detect object 1150 and other objects based on time-domain data set 1080 using, for example, an FFT constant false alarm rate algorithm. Processing circuitry can generate a graphical user interface (GUI) based on the detected objects and output the GUI to a display. The display may be part of detection system 1100 or external to detection system 1100. Additionally or alternatively, processing circuitry 1130 may be configured to generate an alert based on the location and/or velocity of object 1150. Processing circuitry 1130 may be configured to also transmit data about the location and velocity of the detected objects to an external system, such as to another vehicle or to a traffic management system.

The following numbered aspects demonstrate one or more aspects of the disclosure.

Aspect 1. A method includes performing a first transform operation on a first time-domain data set to generate a frequency-domain data set. In addition, the method includes determining that at least one portion of the frequency-domain data set satisfies a first threshold magnitude. The method also includes performing an inverse transform operation on the at least one portion of the frequency-domain data set to generate a second time-domain data set. The method further includes identifying, based on the second time-domain data set, a region of interference in the first time-domain data set.

Aspect 2. The method of the preceding aspect, wherein determining that the at least one portion of the frequency-domain data set satisfies the first threshold magnitude comprises performing a thresholding operation on the frequency-domain data set to identify the at least one portion of the frequency-domain data set.

Aspect 3. The method of either of the preceding aspects, wherein identifying the region of interference comprises performing a thresholding operation on the second time-domain data set to identify the region of interference.

Aspect 4. The method of the preceding aspects or any combination thereof, further including performing a differencing operation on the second time-domain data set to generate a differential time-domain data set.

Aspect 5. The method of the preceding aspects or any combination thereof, further including performing an absolute-value operation on the second time-domain data set or on the differential time-domain data set to generate a filtered time-domain data set.

Aspect 6. The method of the preceding aspect, further including identifying the region of interference by at least determining that a portion of the filtered time-domain data set satisfies a second threshold magnitude.

Aspect 7. The method of the preceding aspect, wherein determining that the portion of the filtered time-domain data set satisfies the second threshold magnitude comprises performing a second thresholding operation on the filtered time-domain data set to identify the portion of the filtered time-domain data set.

Aspect 8. The method of the preceding aspects or any combination thereof, further including subtracting a portion of the second time-domain data set from the region of interference in the first time-domain data set to generate a reconstructed region.

Aspect 9. The method of the preceding aspect, further including inserting the reconstructed region into the first time-domain data set.

Aspect 10. The method of the preceding aspects or any combination thereof, further including subtracting the second time-domain data set from the first time-domain data set to generate a third time-domain data set.

Aspect 11. The method of the preceding aspect, further including performing a thresholding operation on the third time-domain data set to generate a filtered time-domain data set.

Aspect 12. The method of the preceding aspect, wherein identifying the region of interference is based on the filtered time-domain data set.

Aspect 13. The method of the aspect 10, further including identifying a portion of the third time-domain data set corresponding to the region of interference in the first time-domain data set.

Aspect 14. The method of the preceding aspect, further including inserting the portion of the third time-domain data set into the first time-domain data set.

Aspect 15. The method of the preceding aspects or any combination thereof, determining that a remaining portion of the frequency-domain data set does not satisfy the first threshold magnitude.

Aspect 16. The method of the preceding aspect, wherein the remaining portion of the frequency-domain data set includes frequency bins not in the at least one portion of the frequency-domain data set.

Aspect 17. The method of either of the two preceding aspects, further including performing the inverse transform operation on the remaining portion of the frequency-domain data set to generate a third time-domain data set.

Aspect 18. The method of the preceding aspect, further including identifying a portion of the third time-domain data set corresponding to the region of interference in the first time-domain data set.

Aspect 19. The method of the preceding aspect, further including inserting the portion of the third time-domain data set into the first time-domain data set.

Aspect 20. A method includes performing a first transform operation on a first time-domain data set to generate a first frequency-domain data set. In addition, the method includes determining that at least one frequency bin in the first frequency-domain data set satisfies a first threshold magnitude and generating a second frequency-domain data set including the at least one frequency bin and suppressed values for other frequency bins. The method also includes performing an inverse transform operation on the second frequency-domain data set to generate a second time-domain data set. The method further includes identifying a region of interference in the second time-domain data set.

Aspect 21. The method of the preceding aspect, wherein determining that the at least one frequency bin in the first frequency-domain data set satisfies the first threshold magnitude comprises selecting one or more frequency bins in the first frequency-domain data set having magnitudes that are less than the first threshold magnitude.

Aspect 22. The method of aspect 20, wherein determining that the at least one frequency bin in the first frequency-domain data set satisfies the first threshold magnitude comprises selecting one or more frequency bins in the first frequency-domain data set having magnitudes that are less than or equal to the first threshold magnitude.

Aspect 23. The method of any of the three preceding aspects, further including subtracting the region of interference in the second time-domain data set from a corresponding region in the first time-domain data set to generate a reconstructed region.

Aspect 24. The method of the preceding aspect, further including inserting the reconstructed region into the first time-domain data set to generate a repaired time-domain data set.

Aspect 25. A device includes a receiver configured to generate an analog signal based on received signals. The device also includes an analog-to-digital converter configured to convert the analog signal to a first time-domain data set. The device further includes processing circuitry configured to perform the method of the preceding aspects or any combination thereof.

Aspect 26. A device includes a receiver configured to generate an analog signal based on received signals. The device also includes an analog-to-digital converter configured to convert the analog signal to a first time-domain data set. The device further includes processing circuitry configured to perform a first transform operation on the first time-domain data set to generate a frequency-domain data set. In addition, the processing circuitry is configured to determine that at least one portion of the frequency-domain data set satisfies a first threshold magnitude. The processing circuitry is also configured to perform an inverse transform operation on the at least one portion of the frequency-domain data set to generate a second time-domain data set. The processing circuitry is further configured to identify, based on the second time-domain data set, a region of interference in the first time-domain data set.

Aspect 27. The device of either of the two preceding aspects, wherein the receiver comprises a radar receiver.

Aspect 28. The device of any of the three preceding aspects, wherein the device is part of an automotive radar configured to be installed on an automobile.

Aspect 29. A non-transitory computer-readable medium has executable instructions stored thereon, configured to be executable by processing circuitry for causing the processing circuitry to perform the method of aspects 1-24 or any combination thereof.

Aspect 30. A non-transitory computer-readable medium has executable instructions stored thereon, configured to be executable by processing circuitry for causing the processing circuitry to perform a first transform operation on a first time-domain data set to generate a frequency-domain data set. In addition, the instructions cause the processing circuitry to determine that at least one portion of the frequency-domain data set satisfies a first threshold magnitude. The instructions also cause the processing circuitry to perform an inverse transform operation on the at least one portion of the frequency-domain data set to generate a second time-domain data set. The instructions further cause the processing circuitry to identify, based on the second time-domain data set, a region of interference in the first time-domain data set.

Aspect 31. The non-transitory computer-readable medium of either of the two preceding aspects, wherein the non-transitory computer-readable medium is part of an automotive radar configured to be installed on an automobile.

Aspect 32. A system comprising means for performing the method of aspects 1-24 or any combination thereof.

This disclosure has attributed functionality to processing circuitry 1130. Processing circuitry 1130 may include one or more processors. Processing circuitry 1130 may include any combination of integrated circuitry, discrete logic circuitry, analog circuitry, such as one or more microprocessors, microcontrollers, digital signal processors, application specific integrated circuits, central processing units, field-programmable gate arrays, hardware accelerators, and/or any other processing resources. In some examples, processing circuitry 1130 may include multiple components, such as any combination of the processing resources listed above, as well as other discrete or integrated logic circuitry, and/or analog circuitry.

The techniques described in this disclosure may also be embodied or encoded in an article of manufacture including a non-transitory computer-readable storage medium, such as memory 1140. Example non-transitory computer-readable storage media may include random access memory (RAM), read-only memory (ROM), programmable ROM, erasable programmable ROM, electronically erasable programmable ROM, flash memory, a solid-state drive, a hard disk, magnetic media, optical media, or any other computer readable storage devices or tangible computer readable media. The term "non-transitory" may indicate that the storage medium is not embodied in a carrier wave or a propagated signal. In certain examples, a non-transitory storage medium may store data that can, over time, change (e.g., in RAM or cache).

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

It is understood that the present disclosure provides a number of exemplary embodiments and that modifications are possible to these embodiments. Such modifications are expressly within the scope of this disclosure. Furthermore, application of these teachings to other environments, applications, and/or purposes is consistent with and contemplated by the present disclosure.

What is claimed is:

1. A method comprising:
performing, by processing circuitry, a first transform operation on a first time-domain data set to generate a frequency-domain data set;
determining, by the processing circuitry, that at least one portion of the frequency-domain data set satisfies a first threshold magnitude;
performing, by the processing circuitry, an inverse transform operation on the at least one portion of the frequency-domain data set to generate a second time-domain data set; and
identifying, by the processing circuitry and based on the second time-domain data set, a region of interference in the first time-domain data set.

2. The method of claim 1, further comprising:
performing an absolute-value operation on the second time-domain data set to generate a filtered time-domain data set; and
identifying the region of interference by at least determining that a portion of the filtered time-domain data set satisfies a second threshold magnitude.

3. The method of claim 1, further comprising:
performing a differencing operation on the second time-domain data set to generate a differential time-domain data set;
performing an absolute-value operation on the differential time-domain data set to generate a filtered time-domain data set; and
identifying the region of interference by at least determining that a portion of the filtered time-domain data set satisfies a second threshold magnitude.

4. The method of claim 1, further comprising:
subtracting a portion of the second time-domain data set from the region of interference in the first time-domain data set to generate a reconstructed region; and
inserting the reconstructed region into the first time-domain data set.

5. The method of claim 1, further comprising:
subtracting the second time-domain data set from the first time-domain data set to generate a third time-domain data set; and
performing a thresholding operation on the third time-domain data set to generate a filtered time-domain data set,
wherein identifying the region of interference is based on the filtered time-domain data set.

6. The method of claim 1, further comprising:
subtracting the second time-domain data set from the first time-domain data set to generate a third time-domain data set;
identifying a portion of the third time-domain data set corresponding to the region of interference in the first time-domain data set; and
inserting the portion of the third time-domain data set into the first time-domain data set.

7. The method of claim 1, further comprising:
determining that a remaining portion of the frequency-domain data set does not satisfy the first threshold magnitude;
performing the inverse transform operation on the remaining portion of the frequency-domain data set to generate a third time-domain data set;
identifying a portion of the third time-domain data set corresponding to the region of interference in the first time-domain data set; and
inserting the portion of the third time-domain data set into the first time-domain data set.

8. A device comprising:
a receiver configured to generate an analog signal based on received signals;
an analog-to-digital converter configured to convert the analog signal to a first time-domain data set; and
processing circuitry configured to:
perform a first transform operation on the first time-domain data set to generate a frequency-domain data set;
determine that at least one portion of the frequency-domain data set satisfies a first threshold magnitude;
perform an inverse transform operation on the at least one portion of the frequency-domain data set to generate a second time-domain data set; and
identify, based on the second time-domain data set, a region of interference in the first time-domain data set.

9. The device of claim 8, wherein the processing circuitry is further configured to:
perform an absolute-value operation on the second time-domain data set to generate a filtered time-domain data set; and
identify the region of interference by at least determining that a portion of the filtered time-domain data set satisfies a second threshold magnitude.

10. The device of claim 8, wherein the processing circuitry is further configured to:
perform a differencing operation on the second time-domain data set to generate a differential time-domain data set;
perform an absolute-value operation on the differential time-domain data set to generate a filtered time-domain data set; and
identify the region of interference by at least determining that a portion of the filtered time-domain data set satisfies a second threshold magnitude.

11. The device of claim 8, wherein the processing circuitry is further configured to:
subtract a portion of the second time-domain data set from the region of interference in the first time-domain data set to generate a reconstructed region; and
insert the reconstructed region into the first time-domain data set.

12. The device of claim 8, wherein the processing circuitry is further configured to:
subtract the second time-domain data set from the first time-domain data set to generate a third time-domain data set; and
perform a thresholding operation on the third time-domain data set to generate a filtered time-domain data set,
wherein the processing circuitry is configured to identify the region of interference based on the filtered time-domain data set.

13. The device of claim 8, wherein the processing circuitry is further configured to:
subtract the second time-domain data set from the first time-domain data set to generate a third time-domain data set;
identify a portion of the third time-domain data set corresponding to the region of interference in the first time-domain data set; and insert the portion of the third time-domain data set into the first time-domain data set.

14. The device of claim 8, wherein the processing circuitry is further configured to:
   determine that a remaining portion of the frequency-domain data set does not satisfy the first threshold magnitude;
   perform the inverse transform operation on the remaining portion of the frequency-domain data set to generate a third time-domain data set;
   identify a portion of the third time-domain data set corresponding to the region of interference in the first time-domain data set; and
   insert the portion of the third time-domain data set into the first time-domain data set.

15. A non-transitory computer-readable medium having executable instructions stored thereon, configured to be executable by processing circuitry for causing the processing circuitry to:
   perform a first transform operation on a first time-domain data set to generate a frequency-domain data set;
   determine that at least one portion of the frequency-domain data set satisfies a first threshold magnitude;
   perform an inverse transform operation on the at least one portion of the frequency-domain data set to generate a second time-domain data set; and
   identify, based on the second time-domain data set, a region of interference in the first time-domain data set.

16. The non-transitory computer-readable medium of claim 15, wherein the executable instructions are configured to be executable by the processing circuitry for further causing the processing circuitry to:
   perform an absolute-value operation on the second time-domain data set to generate a filtered time-domain data set; and
   identify the region of interference by at least determining that a portion of the filtered time-domain data set satisfies a second threshold magnitude.

17. The non-transitory computer-readable medium of claim 15, wherein the executable instructions are configured to be executable by the processing circuitry for further causing the processing circuitry to:
   subtract a portion of the second time-domain data set from the region of interference in the first time-domain data set to generate a reconstructed region; and
   insert the reconstructed region into the first time-domain data set.

18. The non-transitory computer-readable medium of claim 15, wherein the executable instructions are configured to be executable by the processing circuitry for further causing the processing circuitry to:
   subtract the second time-domain data set from the first time-domain data set to generate a third time-domain data set; and
   perform a thresholding operation on the third time-domain data set to generate a filtered time-domain data set,
   wherein the executable instructions to identify the region of interference comprise instructions to identify the region of interference based on the filtered time-domain data set.

19. The non-transitory computer-readable medium of claim 15, wherein the executable instructions are configured to be executable by the processing circuitry for further causing the processing circuitry to:
   subtract the second time-domain data set from the first time-domain data set to generate a third time-domain data set;
   identify a portion of the third time-domain data set corresponding to the region of interference in the first time-domain data set; and
   insert the portion of the third time-domain data set into the first time-domain data set.

20. The non-transitory computer-readable medium of claim 15, wherein the executable instructions are configured to be executable by the processing circuitry for further causing the processing circuitry to:
   determine that a remaining portion of the frequency-domain data set does not satisfy the first threshold magnitude;
   perform the inverse transform operation on the remaining portion of the frequency-domain data set to generate a third time-domain data set;
   identify a portion of the third time-domain data set corresponding to the region of interference in the first time-domain data set; and
   insert the portion of the third time-domain data set into the first time-domain data set.

* * * * *